United States Patent [19]
Kuo et al.

[11] Patent Number: 5,938,830
[45] Date of Patent: Aug. 17, 1999

[54] PIGMENTED INKS AND N-(1,2-DICARBOXYETHYL)-N-DISUBSTITUTED SULFOSUCCINAMATE DISPERSANTS USED THEREWITH

[75] Inventors: Richard J. Kuo; Jennifer Jeannette, both of St. Paul, Minn.

[73] Assignee: Minnesota Mining and Manufacturing Company, St. Paul, Minn.

[21] Appl. No.: 09/025,054

[22] Filed: Feb. 17, 1998

[51] Int. Cl.$^6$ ..................................................... C09D 11/02
[52] U.S. Cl. ..................................... 106/31.75; 106/31.86
[58] Field of Search ............................. 106/31.75, 31.86

[56] References Cited

U.S. PATENT DOCUMENTS

| | | | |
|---|---|---|---|
| 4,155,773 | 5/1979 | Ferrill, Jr. | 106/309 |
| 4,427,810 | 1/1984 | Chisvette et al. | 524/88 |
| 4,597,794 | 7/1986 | Ohta et al. | 106/31.6 |
| 4,959,661 | 9/1990 | Buxton et al. | 346/1.1 |
| 5,085,698 | 2/1992 | Ma et al. | 106/31.6 |
| 5,125,968 | 6/1992 | Takimoto et al. | 106/31.86 |
| 5,725,647 | 3/1998 | Carlson et al. | 106/31.86 |
| 5,738,206 | 4/1998 | Souza | 200/43.16 |
| 5,741,356 | 4/1998 | Badejo et al. | 106/493 |
| 5,840,106 | 11/1998 | Krepski et al. | 106/31.86 |

FOREIGN PATENT DOCUMENTS 0 799 870  10/1997  European Pat. Off. .

*Primary Examiner*—Helene Klemanski
*Attorney, Agent, or Firm*—Gary L. Griswold; John H. Hornickel

[57] ABSTRACT

Pigmented inks are disclosed comprising an aqueous medium, a pigment, and a N-disubstituted sulfosuccinamate dispersant, preferably tetrasodium N-(1,2-dicarboxyethyl)-N-octadecyl sulfosuccinamate. Such dispersants reduce the agglomeration of pigment particles and reduce or eliminate the deposition of foreign substances on heater elements during the jetting process. A variety of pigments, dispersants, humectants, and aqueous media can be used. Such dispersants provide inks with good stability, few kogation problems, long decap times, and no color-to-color bleed, and relatively fast drying times.

16 Claims, No Drawings

PIGMENTED INKS AND N-(1,2-DICARBOXYETHYL)-N-DISUBSTITUTED SULFOSUCCINAMATE DISPERSANTS USED THEREWITH

FIELD OF INVENTION

The present invention relates to water-based pigmented inks, and in particular, such inks adapted for use with ink jet printing applications.

BACKGROUND OF INVENTION

In recent years, the use of ink jet printers in numerous applications has increased dramatically. Such printers make use of liquid-based inks which are jetted onto a receptor, typically a sheet of paper or film, to produce an image. By using four basic ink colors (cyan, magenta, yellow, and black) in various combinations and concentrations, virtually any color may be produced as part of the printed image. Additionally, ink jet technology is well-suited for high resolution graphic images, particularly those produced using electronic printing systems. Such systems typically employ computer technology to create, modify, and store images, text, graphics and the like.

Many of the inks that have been used in the past with ink jet and other printers are primarily comprised of dyes contained within organic- or water-based carrier liquids. Although such inks may offer satisfactory performance in certain applications, the present trend is away from such systems, since such systems tend to produce images that lack the light stability and durability required for outdoor and similarly demanding applications.

In order to solve this problem, inks prepared by using pigments, instead of dyes, as colorants have been investigated.

Pigmented inks for ink jet applications have to meet several stringent requirements. For example, particle size has to be very small and particle size distribution has to be narrow in order to avoid pigment settling and nozzle plugging. The dispersion has to have good stability against agglomeration in order to avoid nozzle plugging and to have good shelf life. The ink has to have good thermal stability, particularly for application in thermal ink jet printers, in order to avoid "kogation".

Pigment dispersions are thermodynamically unstable. The suspended pigment particles tend to agglomerate due to attractive van der Waals forces. Since ink jet printers make use of very small jet nozzles (on the order of less than about 80 micrometers) to provide high resolution images, the resulting pigment agglomeration has a tendency to plug the printer heads. Additionally, in the case of thermal ink jet systems, such inks also suffer from the tendency of materials to settle onto, and coat, the heating elements inside the nozzles of the printer head. This causes a reduced thermal efficiency of the print head which results in the formation of smaller ink droplets, lower drop velocity, and lower image quality. This effect is commonly referred to as "kogation".

To overcome the problems described above, dispersants are typically employed to adsorb onto pigment surface to build a protective layer, (either electrostatically or sterically or a combination of both,) around each particle to counteract the attractive forces.

In one approach, as disclosed in U.S. Pat. Nos. 5,125,968 and 4,959,661, the dispersants are selected from surfactants which contain a hydrophilic portion as well as a hydrophobic portion.

In another approach, polymers having hydrophilic segments and hydrophobic segments have been used. Polymer dispersants having both random and block structures have been disclosed. Examples of these approaches are described in U.S. Pat. No. 4,597,794 and U.S. Pat. No. 5,085,698.

Other attempts involving the use of polymeric dispersants have been made as well. For example, water-soluble polymers such as styrene-acrylic acid copolymers have also been considered, yet these have yielded only partial success. In particular, such systems, although promising, have tended to produce non-uniform printed solid block images. The lack of uniformity in the printed image, which becomes more pronounced with prolonged printing, is caused by incomplete coverage of the receptor surface in the image area.

This problem, commonly referred to as "banding" results from progressively smaller projected ink drops over the course of a printing job. This effect is believed to be a result of kogation, caused by deposition of thermal insulating materials on the heating elements within the printing cartridge. As a result, heat transfer efficiency into the ink is decreased, thereby reducing the ability to produce properly sized ink bubbles needed for the printing process. Even if the deposited material is thermally conductive, it may still change the nucleation behavior on the heater surface during heating which also may adversely affect the bubble formation. Another problem which is often observed to be associated with polymeric dispersants is that the ink tends to solidify at a nozzle tip to cause obstruction.

Another critical requirement for a pigmented ink jet ink is long decap time so that crusting of the ink composition does not occur on the nozzle plate either during printing or when the printer is in the idle mode.

"Decap time" is defined as the length of time over which an ink remains fluid in the nozzle openings when exposed to air so that ink drops can be fired at their intended targets. Crusting of the nozzle plate will result in poor print quality or even worse may completely plug nozzles thereby causing total print failure. Humectants may be added to promote long decap times, but they must be carefully selected to neither cause flocculation of the pigmented ink dispersions nor promote kogation.

A third important property for pigmented inks is the ability to dry fast once ink drops are placed on the receptor to produce the intended image. Fast drying is important because it is one of the key factors that determines the printer productivity.

The requirement of long decap time and the requirement of fast printed image drying are often in conflict. For example, in order to overcome the crusting problem and improve decap time, a significant amount of a high boiling cosolvent such as ethylene glycol or diethylene glycol is normally employed in the ink composition to reduce the rate of evaporation. However, since these types of cosolvents tend to dramatically reduce the drying rate of the printed image that diminishes the requirement of fast printed image drying.

SUMMARY OF INVENTION

In view of the foregoing, a need exists for water-based pigmented inks for ink jet applications that show
  (1) reduced agglomeration or flocculation of pigment particles,
  (2) reduced deposition of foreign substances on heater elements during the jetting process,
  (3) long "decap times" and no crusting on the ink jet printer nozzle plate for an acceptable period of time, (4) fast drying of the printed image, (5) good image quality.

A need also exists for inks which offer stability in both short- and long-term regimes.

The present invention solves these problems in the art by providing an ink, comprising:

(a) an aqueous medium, (b) a pigment, and (c) a dispersant comprising a N-(1,2-dicarboxyethyl)-N-disubstituted sulfosuccinamate.

The inks of the present invention can comprise any pigment or combination of pigments. In particular, the inventive inks may be provided with black, cyan, yellow, and magenta pigments. By varying the individual color densities and overlying monochrome images, it is possible to provide virtually any color on an appropriate substrate. When combined with electronic graphic image systems, virtually any image that can be created or stored electronically can be reproduced using an ink jet printer. Of course, it should be understood that the present invention is not intended to be limited to inks of the four colors discussed above. Rather, inks employing any pigment that is compatible with electronic graphic image systems may be used herein.

More particularly, the inks of the present invention comprise specific N-(1,2-dicarboxyethyl)-N-disubstituted sulfosuccinamates as dispersants or combinations of dispersants. Unexpectedly, the N-(1,2-dicarboxyethyl)-N-disubstituted sulfosuccinamates provide printing of multi-colored images on ink receptor film with reduced color to color bleed or color to color feathering, and reduced image defect caused by mudcracking problems. The inks containing N-(1,2-dicarboxyethyl)-N-disubstituted sulfosuccinamate dispersants can be formulated to exhibit a broad range of desired properties such as viscosity and surface tension, to exhibit resistance to nozzle clogging, to produce fast drying printed images with good color quality, and to provide an ink that is stable over time.

Nonlimiting examples of inks include thermal pigmented inkjet inks, piezo inkjet pigmented inks, bubble jet pigmented inks, marker inks, fine point roller ball pens, plotter pen inks, fountain pen inks, and the like.

More particularly, tetrasodium N-(1,2-dicarboxyethyl)-N-octadecyl sulfosuccinamate can be used to produce excellent water based pigmented inkjet ink dispersions. Tetrasodium N-(1,2-dicarboxyethyl)-N-octadecyl sulfosuccinamate is effective in stabilizing pigment particles for making very stable colloidal dispersions free from agglomeration or flocculation for long period of time.

Quite surprisingly, water based pigment inks formulated with tetrasodium N-(1,2-dicarboxyethyl)-N-octadecyl sulfosuccinamate as dispersant solve the problem of color to color bleed or color to color feathering often encountered when color graphics are generated on inkjet receptor film such as 3M Scotchprint™ Opaque Imaging Media (Product No. 3657-10 from Minnesota Mining and Manufacturing Company (3M) St. Paul, Minn., USA), using an inkjet printer, such as NovaJet III printer (Encad Corporation, San Diego, Calif., USA), by combining the individual color of cyan, magenta, and yellow inks in various proportions. Many thermal inkjet inks, when printed in various colors on ink jet receptor, tend to bleed into one another. It is highly desirable to have a border between colors that is clean and free from the invasion of one color into the other.

Moreover, when using inks of the present invention, color images on inkjet receptor film printed with the inventive ink set are free from mudcracking problems even with heavy ink laydown.

Another aspect of the present invention is the combination of a pigmented ink of the present invention and an inkjet cartridge as an inkjet delivery system.

One feature of the present invention is ease by which the inkjet inks can be formulated for use.

An advantage of the present invention is that a tetrasodium N-(1,2-dicarboxyethyl)-N-octadecyl sulfosuccinamate dispersant reduces the agglomeration or flocculation of pigment particles which reduces the deposition of foreign substances on heater elements during the jetting process.

Another advantage of the present invention is that N-(1,2-dicarboxyethyl)-N-disubstituted sulfosuccinamate dispersants do not cause the agglomeration or flocculation of pigment particles.

Another advantage of the present invention is an inkjet ink that offers stability in both short- and long-term regimes.

Other features and advantages will be described in conjunction with embodiments of the invention.

EMBODIMENTS OF INVENTION

Each of the elements of the pigmented inkjet ink of the present invention can be varied according to the needs of those skilled in the art within the following parameters.

Pigment:

One important consideration in formulating a set of colored inks for printing color images is the compatibility of the inks with one another. This is important since the inks will be mixed together, or at the very least, contacted with one another, during the printing process when secondary colors are to be generated. When incompatible inks are mixed together, they can coalesce and present a mottled, non-uniform surface, particularly in solid fill areas. The possibility of coalescence and mottling greatly reduces the quality of the resulting printed image. As such, when used in a multi-color printing process (such as four-color process) it is desirable to formulate each of the various colored inks using compatible, or preferably identical, formulations. Of course, in each of the formulations, the pigment will differ. Unfortunately, however, since the different pigments tend to have different surface properties, it is often very difficult to form inks in which stable pigment suspension liquids can be formulated using the same dispersant. That notwithstanding, the dispersants described below have been found to be compatible with at least one pigment in each of the four primary printing colors.

For black inks, carbon black can be used as the black pigment. The selection of carbon blacks suitable for use with the present invention is based primarily upon considerations of surface oxidation (high "volatiles" preferred), and the degree of blackness (also called jetness) of the pigment. Pigments having a high surface oxide content are more hydrophilic, and thereby much easier to disperse. Pigments with a high degree of blackness or jetness provide a high quality printed image.

Nonlimiting examples of black pigments include carbon black, such as Special Black 4, Special Black 5, Special Black 6, Special Black 4A, Color Black FW 200, and Color Black FW2 pigments (all manufactured by Degussa Corporation of Ridgefield, N.J.); Raven 1200 carbon black, Raven 1170 carbon black, Raven 3500 carbon black, and Raven 5750 carbon black pigments (all available from Columbian Chemical Corp. of Atlanta, Ga.); Mogul L carbon black and Sterling NS carbon black pigments (both available from Cabot Corp. of Boston, Mass.); and Carbon Black MA-100 pigment (available from Mitsubishi Kasei Corp. of Tokyo, Japan).

Nonlimiting examples of yellow pigments include Fanchon Fast Y-5700 PY 139 and Fanchon Fast Yellow Y-5688 C.I. Pigment Yellow 150 pigments (available from Bayer Corp. of Rock Hill, S.C.); Sunbrite Yellow 14 presscake and Spectra Pac Yellow 83 pigments (both available from Sun Chemical Corp. of Cincinnati, Ohio); Sandorin Yellow 6GL (available from Clariant Corp. of Charlotte, N.C.); and Irgazin Yellow 2RLT PY 110, Irgazin Yellow 2GLTN PY 109, Irgazin Yellow 2GLTE PY 109, and Irgazin Yellow 3RLTN PY 110 pigments (all available from Ciba Geigy). A primary consideration for selecting yellow pigment is lightfastness, since it is very desirable to produce graphic images that are adapted to outdoor applications. Another consideration is the shade of the pigment. It is generally preferred to have a green shade yellow pigment in this kind of applications. Of all the examples listed above, Fanchon Fast Yellow Y-5688 C.I. Pigment Yellow 150 and Sandorin Yellow 6GL are most preferred because they meet the two considerations.

For magenta inks, lightfastness is also the primary consideration. Quinacridone magenta pigment is known to have excellent lightfastness, and therefore, is one preferred magenta pigment. Nonlimiting examples of magenta pigments include Quindo Magenta RV-6828 Pigment Red 122, Quindo Magenta RV-6831 Pigment Red 122 presscake, Quindo Red R-6713 PV 19, and Quindo Magenta RV-6843 Pigment Red 202 pigments (all available from Bayer Corp.); and Sunfast Magenta 122 and fast Magenta 202 pigments (both available from Sun Chemical Corp.).

For cyan inks, the considerations above, (i.e., lightfastness, durability, etc.), apply as well. As a variety of satisfactory properties may be found using copper phthalocyanine as a cyan pigment, inks comprising such pigments are one preferred embodiment. Nonlimiting examples of cyan pigments include Palomar Blue B-4810 PB 15:3, Palomar Blue B-4710 PB 15:1, and Palomar Blue B-4900 pigments (all available from Bayer Corp.); and Sunfast Blue 15:3 presscake and Sunfast Blue 15:3 powder (available from Sun Chemical Corp.)

Dispersant:

The inks of the present invention can contain a N-(1,2-dicarboxyethyl)-N-disubstituted dispersant present in the ink formulation in an amount ranging from about 0.01 to about 6 percent and preferably from about 0.05 to about 3 percent by weight of the total ink composition.

Nonlimiting examples of N-(1,2-dicarboxyethyl)-N-disubstituted sulfosuccinamate dispersants include tetrasodium N-(1,2-dicarboxyethyl)-N-octadecyl sulfosuccinamate, tetrasodium N-(1,2-dicarboxyethyl)-N-decyl sulfosuccinamate, tetrasodium N-(1,2-dicarboxyethyl)-N- hexadecyl sulfosuccinamate, tetraammonium N-(1,2-dicarboxyethyl)-N-dodecyl sulfosuccinamate, tetraammonium N-(1,2-dicarboxyethyl)-N-tetradecyl sulfosuccinamate, and combinations thereof.

Generally, dispersants useful in the present invention can be grouped according to the following Formula (I):

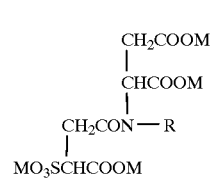

$$\begin{array}{c} CH_2COOM \\ | \\ CHCOOM \\ | \\ CH_2CON-R \\ | \\ MO_3SCHCOOM \end{array} \quad (I)$$

where M is selected from the group of hydrogen ion, alkali metal ions, and quaternary ammonium ion and where R is alkyl, alkenyl, aralkyl, or aryl group.

N-(1,2-dicarboxyethyl)-N-disubstituted sulfosuccinamate dispersants of Formula (I) are commercially available from different sources. Nonlimiting examples of commercially branded dispersants include Aerosol-22 from Cytec Industries (Morristown, N.J.) and Monawet SNO-35 from Mona Industries Inc. (Paterson, N.J.).

Aqueous Medium:

In addition to the pigments, and the dispersants, the inks will comprise primarily water as the aqueous medium which serves as a pigment suspension agent. In addition to water in the aqueous medium, other additives provide various properties.

For example, high boiling point water miscible organic cosolvents such as polyhydric alcohols, may also be employed to help to control the drying rate. Suitable high boiling cosolvents include, for example ethylene glycol, propylene glycol, butylene glycol, triethylene glycol, 1,2,6-hexanetriol, thiodiglycol, hexylene glycol, and diethylene glycol, trimethylolpropane, trimethylolethane, sorbitol; glycerol, and lower alkyl ethers such as ethylene glycol monomethyl or monoethyl ether, diethylene glycol methyl or ethyl ether, and triethylene glycol monomethyl or monoethyl ether. Alkylene glycols such as diethylene glycol are the preferred polyhydric alcohols. Other useful additives which will also help to control drying rate include urea and its derivatives, amides, hydroxyether derivatives such as butyl carbitol or cellusolve, amino alcohols, and other water soluble or water miscible materials, as well as mixtures thereof.

The polyols can comprise from about 5 to about 60 weight percent of the aqueous medium and preferably from about 8 to about 40 weight percent.

Optional Additives:

Inks of the present invention can employ ionic and nonionic surfactants to improve wetting and to reduce the surface tension of the ink system. Nonlimiting examples of ionic surfactants include Aerosol OT surfactant (available from American Cyanamid of West Paterson, N.J.); and Darvan No. 1 and Darvan No. 7 surfactants (both available from T. T. Vanderbilt Co. of Norwalk, Conn.).

Nonlimiting examples of nonionic surfactants include Triton X-100, Triton X-102, Triton X-114, Triton X-101, and Triton CF-10 surfactants (all available from Union Carbide Corp.); Surfynol CT-136 (which is actually a mixture of anionic and nonionic surfactants), Surfynol 104, Surfynol 465, and Surfynol TG surfactants (all available from Air Products and Chemicals of Allentown, Pa.); and Tergitol NP-9 and Tergitol NP-10 surfactants (both available from Union Carbide Chemicals and Plastics Co. of Danbury, Conn.).

The surfactants can comprise from about 0.01 to about 6 weight percent of the aqueous medium and preferably from about 0.05 to about 4 weight percent.

In addition to water, pigment, and the dispersant described above, the inks can typically also include other ingredients to provide various properties. For example, a glycol, such as diethylene glycol may be employed in combination with a variety of humectants, such as sulfonated polyethylene oxides (disclosed in copending, coassigned U.S. patent application Ser. No. 08/757,897 (Carlson, et al) incorporated by reference herein), urea, trimethylolpropane, 1,4-butanediol, 1,2,4-butanetriol, and many others to control the drying rate of the inks.

Other ink additives commonly known in the art can also be used, including biocides, fungicides, defoamers, corrosion inhibitors, viscosity modifiers, pH buffers, penetrants, sequestering agents, and the like.

Other ink additives can include other dispersants, such as aldehyde naphthalene sulfonate dispersants commercially available from Hampshire Chemical Corp., Lexington, Mass. These sulfonate dispersants further assist in meeting the needs of the art.

Ink Processing:

Current compounding technology for the processing of pigment dispersions employs numerous processing technologies. One such technology makes use of ultrasonic energy to achieve mixing and particle deflocculation. Another technology makes use of media mills, such as ball mills, sand mills or attritors. Media mills achieve acceptable pigment dispersions by subjecting the pigment mixture to high intensity microshearing and cascading which breaks down agglomerations of the pigment particles.

Homogenizers and emulsifiers can also be used for ink compounding. These systems generally function by forcing a premix of solids and liquids to collide against a surface, or to collide against itself.

The conventional two-roll mill and three-roll mill processing technologies can be effective techniques for dispersing pigment particles if the materials can be formulated into highly viscous paste for processing, then followed by a let-down step to produce the final ink.

In still another processing method, the pigment dispersion can be forced through a series of small nozzles having diameters on the order of about 150 micrometers to about 1000 micrometers. Such systems must be able to withstand very high pressures at high fluid velocities. Three different configurations for such systems may be used: a) a "wedge" configuration with orifices of decreasing diameter, b) a "wedge" configuration within which the orifices have cavitation enhancement devices, and c) an "impinging jet" configuration in which the dispersion stream is split into at least two elements, each stream is passed through an orifice to create a jet, and the jet streams are recombined by impinging them against each other. Each of these systems has been found to yield satisfactory results when processing water-based pigmented inks. Examples of these processes can be found in U.S. Pat. No. 5,482,077 (Serafin et al.), U.S. patent application Ser. Nos. 08/555,671 and 08/693,552 (both Serafin et al.), and PCT Patent Publications WO96/14925 and WO96/14941 (both Serafin et al.), all incorporated by reference herein.

After the ink has been processed, it is filtered using, for example, a 5 micrometer Whatman Polycap 36 HD cartridge type filter (available from Arbor Technology, Ann Arbor, Mich.). A pump, such as a Masterflex peristaltic pump (available from Barnant Co., Barrington, Ill.) can be used to feed the ink through the filter. A flow rate of about 120 milliliters per minute with a back pressure of about 3 psi (0.21 kg/cm$^2$ metric) is preferred.

Usefulness of the Invention

The inks described in this approach have general utility in printing, particularly in inkjet printing applications.

Although there are a wide variety of dispersants that are known in the prior art for water based pigmented inkjet inks, they are not without certain problems. For example, many dispersants are very selective as far as being able to provide good dispersion stability. In many instances, since different class of pigments tend to have different surface properties, it is often difficult to form inks in which stable pigment dispersions can be formulated using the same dispersant. Because of dispersant selectivity for different pigments, a set of multi-colored inks may require several different dispersants. This may lead to a high risk of ink-ink incompatibility. Incompatible inks may result in poor printed image quality. Another problem which is often observed to be associated with polymeric dispersants is that they tend to impart an undesirable high viscosity to the resulting inks. In addition, inks made with polymeric dispersants tend to solidify at a nozzle tip to cause obstruction. Therefore there is a continuing need for improved dispersants for pigmented inks.

At least one pigment in each of the three primary printing colors, cyan, magenta, and yellow has been found to be compatible with the preferred tetrasodium N-(1,2-dicarboxyethyl)-N-octadecyl sulfosuccinamate dispersant of the present invention. Using this chemical as dispersant, a set of stable water based cyan, magenta, and yellow pigmented inks has been formulated.

There are several advantages of using tetrasodium N-(1,2-dicarboxyethyl)-N-octadecyl sulfosuccinamate as dispersant for making pigmented inkjet ink set. The most surprising advantage is the total absence of color to color bleed commonly observed with many thermal ink jet inks when printed in various colors on ink jet receptor film such as 3M Scotchprint™ Opaque Imaging Media (Product No. 3657-10). Freedom from the invasion of one color into the other gives clean border between colors and thus results in printed color images of excellent quality. Another surprising advantage is the total absence of mudcracking problem even in the 3-color black image area with 300 percent ink laydown. Mudcracking problem, which gives rise to poor image quality, is commonly observed when pigmented inks are used to produce images on ink jet receptor films. An ink set that is free from mudcracking is very desirable.

Specific embodiments of the invention appear in the following examples.

EXAMPLES

A set of cyan, magenta, and yellow water based pigment inks were made as follows:

Example 1

(Cyan):

A pigmented cyan ink was prepared according to the following procedure:

In an 8 oz. (228 ml) glass jar, the following ingredients were combined:

6.0 grams of urea (obtained from Aldrich Chemical Co.)

8.0 gram of trimethylolpropane (obtained from Aldrich Chemical Co.)

8.0 grams of 1,4-butanediol (obtained from Aldrich Chemical Co.)

20.0 grams of diethylene glycol (Aldrich Chemical Co.)

145.6 grams of de-ionized water

The mixture was mixed using gentle shaking until a homogeneous solution was obtained.

4.6 grams of Aerosol-22 N-disubstituted sulfosuccinamate (35% solids, obtained from Cytec Industries Inc., West Paterson, N.J.) was added to the above solution with additional gentle shaking until it became a homogeneous solution.

7.8 grams of Sunfast Blue 15:3 aqueous presscake colorant (51% solids, obtained from Sun Chemical Corp., Cincinnati, Ohio) was then added to the above solution.

The mixture was mixed on a roller mixer at low rpm for about 3 hours to break up presscake clumps. At this point, the pH of the resulting mixture was measured and determined to be 7.7.

The pH of the mixture was adjusted to 8.8 by adding dropwise 1 N NaOH solution.

The pigment was dispersed by using a Misonix model XL2020 Sonicator ((Misonix Incorporated, Farmingdale, N.Y.) for a total of 8 minutes at a setting of 176 Watts.

The dispersion was allowed to stand on a benchtop for 15 hours for large particles to settle. Then about 120 grams of the top portion of the dispersion was carefully decanted into a clean 8 oz. (228 ml) glass jar to avoid large particles. About 80 grams was used to fill two empty HP 51626A DeskJet cartridges for different printing tests, and the remaining 40 grams was used for other tests such as surface tension, viscosity, final pH, particle size before and after heat aging.

Example 2

(Magenta):

A pigmented magenta ink was prepared according to the following procedure:

In an 8 oz. (228 ml) glass jar, the following ingredients were combined:

6.0 grams of urea (Aldrich Chemical Co.)

8.0 gram of trimethylolpropane (Aldrich Chemical Co.)

8.0 grams of 1,4-butanediol (Aldrich Chemical Co.)

20.0 grams of diethylene glycol (Aldrich Chemical Co.)

138.4 grams of de-ionized water

The mixture was mixed using gentle shaking until a homogeneous solution was obtained.

5.3 grams of Aerosol-22 N-disubstituted sulfosuccinamate (35% solids, obtained from Cytec Industries Inc., West Paterson, N.J.) was added to the above solution with additional gentle shaking until it became a homogeneous solution.

14.4 grams of Quindo Magenta RV6831 Pigment Red 122 aqueous presscake colorant (32% solids, obtained from Bayer Corp., Rock Hill, S.C.) was added to the above solution.

The mixture was mixed on a roller mixer at low rpm for about 3 hours to break up presscake clumps. At this point, the pH of the resulting mixture was measured and determined to be 7.76.

The pH of the mixture was adjusted to 8.7 by adding dropwise 1 N NaOH solution.

The pigment was dispersed by using a Misonix model XL2020 Sonicator ((Misonix Incorporated, Farmingdale, N.Y.) for a total of 8 minutes at a setting of 176 Watts.

The dispersion was allowed to stand on a benchtop for 15 hours for large particles to settle. Then about 120 grams of the top portion of the dispersion was carefully decanted into a clean 8 oz. (228 ml) glass jar to avoid large particles. About 80 grams was used to fill two empty HP 51626A DeskJet cartridges for different printing tests, and the remaining 40 grams was used for other tests such as surface tension, viscosity, final pH, particle size before and after heat aging.

Example 3

(Yellow):

A pigmented yellow ink was prepared according to the following procedure:

In an 8 oz. (228 ml) glass jar, the following ingredients were combined:

6.0 grams of urea (Aldrich Chemical Co.)

8.0 gram of trimethylolpropane (Aldrich Chemical Co.)

8.0 grams of 1,4-butanediol (Aldrich Chemical Co.)

20.0 grams of diethylene glycol (Aldrich Chemical Co.)

147.3 grams of de-ionized water

The mixture was mixed using gentle shaking until a homogeneous solution was obtained.

5.7 grams of Aerosol-22 N-disubstituted sulfosuccinamate (35% solids, obtained from Cytec Industries Inc., West Paterson, N.J.) was added to the above solution with additional gentle shaking until it became a homogeneous solution.

5.0 grams of Fanchon Fast Yellow Y-5688 C.I. Pigment Yellow powder (obtained from Bayer) was then added to the above solution.

The mixture was mixed on a roller mixer at low rpm for about 3 hours. At this point, the pH of the resulting mixture was measured and determined to be 7.4.

The pH of the mixture was adjusted to 8.5 by adding dropwise 1 N NaOH solution.

The pigment was dispersed by using a Misonix model XL2020 Sonicator ((Misonix Incorporated, Farmingdale, N.Y.) for a total of 8 minutes at a setting of 176 Watts.

The dispersion was allowed to stand on a benchtop for 15 hours for large particles to settle. Then about 120 grams of the top portion of the dispersion was carefully decanted into a clean 8 oz. (228 ml) glass jar to avoid large particles. About 80 grams was used to fill two empty HP 51626A DeskJet cartridges for different printing tests, and the remaining 40 grams was used for other tests such as surface tension, viscosity, final pH, particle size before and after heat aging.

Ink Properties

Viscosity was measured with a Brookfield Model DV-II+ Viscometer with UL-Adapter (Brookfield Engineering Laboratories, Inc. Stoughton, Mass.). Surface tension was measured with a Fisher Scientific Model 21 Tensiomat (Fisher Scientific, Pittsburgh, Pa.). pH was measured using a Corning Ion Analyzer 250. Particle size measurements were made with a Horiba LA-910 Analyzer (Horiba Instruments Inc., Irvine, Calif.). Viscosity, surface tension, pH, particle size and particle size distribution of the inks described in Examples 1 to 3 are summarized in the following Table 1:

TABLE 1

|  | Example 1 (Cyan) | Example 2 (Magenta) | Example 3 (Yellow) |
| --- | --- | --- | --- |
| Viscosity (centipoise) | 2.0 | 2.1 | 2.2 |
| Surface tension (dynes/cm) | 39.8 | 39.0 | 40.9 |
| pH | 7.7 | 7.7 | 7.6 |
| Particle size (nanometers) |  |  |  |
| 95% under | 180 | 150 | 155 |
| 80% under | 160 | 120 | 130 |
| 50% under | 140 | 95 | 105 |
| 10% under | 105 | 70 | 70 |
| median | 133 | 99 | 107 |
| mean | 134 | 102 | 108 |
| standard deviation | 24 | 29 | 29 |

Ink Performance

A major criterion of suitability for inkjet ink is dispersion stability. A test is to store dispersions in an oven at 65° C. for 7 days and observe particle size before and after. This is not an easy test to pass, but inks made with tetrasodium N-(1, 2-dicarboxyethyl)-N-octadecyl sulfosuccinamate as dispersant pass the test as shown in the following Table 2. This is probably because each molecule of the dispersant contains a substantial hydrophobic segment, octadecyl hydrocarbon chain, for strong adsorption to the pigment surface, and each molecule carries four ionizable groups to provide strong negative charges on each pigment particle to prevent agglomeration or flocculation.

TABLE 2

|  | Particle Size Before Heat Aging (nanometers) | Particle Size After 7 days 65° C. Aging (nanometers) |
| --- | --- | --- |
| Example 1 (Cyan) | | |
| 95% under | 180 | 180 |
| 80% under | 160 | 160 |
| 50% under | 140 | 140 |
| 10% under | 105 | 105 |
| median | 133 | 133 |
| mean | 134 | 134 |
| standard deviation | 24 | 25 |
| Example 2 (Magenta) | | |
| 95% under | 150 | 150 |
| 80% under | 120 | 120 |
| 50% under | 95 | 95 |
| 10% under | 70 | 70 |
| median | 99 | 98 |
| mean | 102 | 102 |
| standard deviation | 29 | 30 |
| Example 3 (Yellow) | | |
| 95% under | 155 | 160 |
| 80% under | 130 | 130 |
| 50% under | 105 | 105 |
| 10% under | 70 | 70 |
| median | 107 | 106 |
| mean | 108 | 107 |
| standard deviation | 29 | 28 |

All printing tests were done using a NovaJet III printer. One printing test was carried out by continuously printing the ink onto 3M Scotchprint™ Opaque Ink Jet Film (Product No. 3657-10) to make blocks of solid image until the cartridge was empty. All three inks described in Examples 1–3 printed continuously without any problem to produce uniform solid images of good quality. No nozzle plugging was observed during the entire printing process, no banding was visible on the printed images, and the appearance of the each color density remained the same from the beginning to the end of the solid printed blocks.

Color to color bleed was assessed by printing three solid fill circles (5 cm in diameter) of each color, partially overlapping all three circles by passing the circumference of each circle through the centers of the other two circles. When circles of cyan, magenta, and yellow are printed in combination, solid images of blue (overlap of cyan and magenta), green (overlap of cyan and yellow), red (overlap of magenta and yellow), and black (3-color black, overlap of cyan, magenta, and yellow) are generated. Color to color bleed tests for the ink set described in Examples 1–3 were performed both on 3M Scotchprint™ Opaque Ink Jet Film (Product No. 3657-10) and on an inkjet receptor medium disclosed in copending, coassigned U.S. patent application Ser. No. 08/892,902 (Waller et al.), the disclosure of which is incorporated by reference herein. No color bleed was observed for any combination of colors on either inkjet receptor film. All borders between any combination of colors looked very clean and totally free from the invasion of one color into the other.

Another test was carried out by printing a series of seven stripes of colors perpendicular to the web direction. The width of each stripe (downweb direction) is 3.2 cm. The length of each stripe (crossweb direction) depends on the ink receptor film used; 85 cm on 3M Scotchprint™ Opaque Ink Jet Film (Product No. 3657-10) and 30 cm on the Waller et al. film described above. The color stripes were printed in the following order: yellow, magenta, cyan, blue, green, 3-color black, and red. The amounts of ink laydown are as follows: yellow=100%; magenta=100%; cyan=100%; blue= 200% (100% magenta+100% cyan); green=200% (100% cyan+100% yellow); 3-color black=300% (100% yellow+ 100% cyan+100% magenta); red=200% (100% magenta+ 100% yellow). All color stripes show excellent print quality on both ink receptor films. Each stripe gives a uniform, smooth and vivid color, totally free from any defect such as banding, coalescence, mudcracking and other problems. We were surprised to find that even with 300% ink laydown (3-color black) there was no mudcracking on 3M Scotchprint™ Opaque Ink Jet Film (Product No.3657-10) at all. There is no color bleed or feathering between color stripes either. The result also shows that 3-color black (cyan+ magenta+yellow) gives a true black color of excellent quality.

Example 4

(Cyan): Combination of Tetrasodium N-(1,2-dicarboxyethyl)-N-Octadecyl Sulfosuccinamate and Aldehyde Naphthalene Sulfonate A pigmented cyan ink was prepared according to the following procedure:

In an 8 oz. (228 ml) glass jar, the following ingredients were combined:

1.27 grams of Daxad 17 aldehyde naphthalene sulfonate dispersant (obtained from Hampshire Chemical Corp., Lexington, Mass.)

6.0 grams of urea (obtained from Aldrich Chemical Co.)

8.0 grams of trimethylolpropane (obtained from Aldrich Chemical Co.)

7.0 grams of sulfonated polyethylene oxide (described in Applicants' copending U.S. patent application Ser. No. 08/757897, incorporated herein by reference)

18.0 grams of diethylene glycol (Aldrich Chemical Co.)

147.0 grams of de-ionized water

The mixture was mixed using gentle shaking until a homogeneous solution was obtained.

1.6 grams of Aerosol-22 N-disubstituted sulfosuccinamate (35% solids, obtained from Cytec Industries Inc., West Paterson, N.J.) was added to the above solution with additional gentle shaking until it became a homogeneous solution.

11.1 grams of Sunfast Blue 15:3 aqueous presscake colorant (51% solids, obtained from Sun Chemical Corp., Cincinnati, Ohio) was then added to the above solution.

The mixture was mixed on a roller mixer at low rpm for about 3 hours to break up presscake clumps.

The pigment was dispersed by using a Misonix model XL2020 Sonicator (Misonix Incorporated, Farmingdale, N.Y.) for a total of 8 minutes at a setting of 176 Watts.

The pH of the dispersion was adjusted to about 8 by adding dropwise 1 N NaOH solution after the dispersion was allowed to cool to room temperature.

The dispersion was allowed to stand on a benchtop for 15 hours for large particles to settle. Then about 120 grams of the top portion of the dispersion was carefully decanted into a clean 8 oz. (228 ml) glass jar to avoid large particles.

The invention is not limited to these embodiments. The claims follow.

What is claimed is:

1. An ink, comprising:
   (a) an aqueous medium,
   (b) a pigment,
   (c) a dispersant comprising a sulfosuccinamate represented by the following formula:

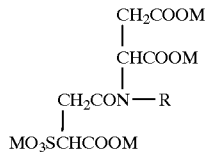

where M is selected from the group consisting of hydrogen ion, alkali metal ions, and quaternary ammonium ion and where R is an alkyl, alkenyl, aralkyl, or aryl group.

2. The ink according to claim 1, wherein the dispersant is tetrasodium N-(1,2-dicarboxyethyl)-N-octadecyl sulfosuccinamate present in an amount ranging from about 0.01 to about 6 percent by weight of the total ink composition.

3. The ink according to claim 2, wherein the dispersant is present in an amount ranging from about 0.05 to about 3 percent by weight of the total ink composition.

4. The ink according to claim 1, further comprising a humectant.

5. The ink according to claim 4, wherein the humectant is a sulfonated polyethylene oxide.

6. The ink according to claim 1, further comprising additives selected from the group consisting of surfactants, biocides, fungicides, defoamers, corrosion inhibitors, viscosity modifiers, pH buffers, penetrants, sequestering agents, and combinations thereof.

7. The ink according to claim 4, further comprising an aldehyde naphthalene sulfonate dispersant.

8. An ink comprising a dispersant comprising tetrasodium N-(1,2-dicarboxyethyl)-N-octadecyl sulfosuccinamate.

9. The ink according to claim 8, further comprising a sulfonated polyethylene oxide and an aldehyde naphthalene sulfonate dispersant.

10. A method of making pigmented inks, comprising the step of mixing
    (a) an aqueous medium,
    (b) a pigment, and
    (c) a dispersant comprising sulfosuccinamate represented by the following formula:

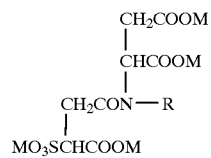

where M is selected from the group consisting of hydrogen ion, alkali metal ions, and quaternary ammonium ion and where R is an alkyl, alkenyl, aralkyl, or aryl group.

11. The method according to claim 10, wherein the sulfosuccinamate is tetrasodium N-(1,2-dicarboxyethyl)-N-octadecyl sulfosuccinamate.

12. The method according to claim 10, further mixing additives selected from the group consisting of humectants, surfactants, biocides, fungicides, defoamers, corrosion inhibitors, viscosity modifiers, pH buffers, penetrants, sequestering agents, and combinations thereof.

13. The method according to claim 10 further comprising an aldehyde naphthalene sulfonate dispersant.

14. A method of printing pigmented inks comprising the step of: jetting inkjet ink from a cartridge to media, wherein the ink comprises:
    (a) an aqueous medium,
    (b) a pigment, and
    (c) a dispersant comprising a sulfosuccinamate represented by the following formula:

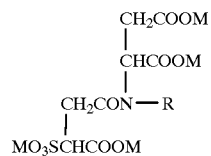

where M is selected from the group consisting of hydrogen ion, alkali metal ions, and quaternary ammonium ion and where R is an alkyl, alkenyl, aralkyl, or aryl group.

15. The ink according to claim 14, further comprising additives selected from the group consisting of humectants, surfactants, biocides, fungicides, defoamers, corrosion inhibitors, viscosity modifiers, pH buffers, penetrants, sequestering agents, and combinations thereof.

16. An ink delivery system, comprising an inkjet cartridge and inkjet ink of claim 1.

* * * * *

UNITED STATES PATENT AND TRADEMARK OFFICE
CERTIFICATE OF CORRECTION

PATENT NO. : 5,938,830
DATED : August 17, 1999
INVENTOR(S) : Richard J. Kuo and Jennifer Jeannette It is certified that error appears in the above-identified patent and that said Letters Patent is hereby corrected as shown below:

Column 9,
Line 15, "((Misonix" should read -- (Misonix --;

Column 10,
Line 26, "((Misonix" should read -- (Misonix --;

Column 12,
Line 45, "08/757897" should read -- 08/757,897 --;

Column 14,
Line 15, "further mixing" should read -- further comprising mixing --.

Signed and Sealed this

Ninth Day of October, 2001

Attest:

NICHOLAS P. GODICI
Attesting Officer
Acting Director of the United States Patent and Trademark Office